United States Patent [19]

Scaringe et al.

[11] Patent Number: 5,061,391
[45] Date of Patent: Oct. 29, 1991

[54] WORKING FLUID FOR THERMALLY POWERED HEAT PUMPING APPLICATIONS

[75] Inventors: Robert P. Scaringe, Rockledge; Jay A. Buckman, Melbourne; Lawrence R. Grzyll, Merritt Island, all of Fla.

[73] Assignee: Mainstream Engineering Corp., Melbourne, Fla.

[21] Appl. No.: 398,832

[22] Filed: Aug. 22, 1989

Related U.S. Application Data

[62] Division of Ser. No. 141,300, Jan. 6, 1988, Pat. No. 4,905,481.

[51] Int. Cl.$^5$ ................................................. C09K 5/02
[52] U.S. Cl. ......................................... 252/67; 62/112; 62/114
[58] Field of Search ....................... 252/67, 69; 62/112, 62/114

[56] References Cited

U.S. PATENT DOCUMENTS

| | | | |
|---|---|---|---|
| 1,734,278 | 11/1929 | Tandenberg | 62/112 |
| 1,955,345 | 4/1934 | Särnmark | 252/69 |
| 4,241,591 | 12/1980 | Edwards | 62/475 |
| 4,467,609 | 8/1984 | Loomis | 252/67 |
| 4,586,344 | 5/1986 | Lutz et al. | 62/112 |

FOREIGN PATENT DOCUMENTS 3729758 4/1989 Fed. Rep. of Germany ........ 252/67

*Primary Examiner*—A. Lionel Clingman
*Assistant Examiner*—Christine A. Skane
*Attorney, Agent, or Firm*—Evenson, Wands, Edwards Lenahan & McKeown

[57] ABSTRACT

An improved thermal energy transfer apparatus and associated working fluid employs a supersonic compressor in place of a conventional turbine-compressor unit within a Rankine heat engine powering a vapor compression heat pump. The compressor comprises a supersonic nozzle having an inlet section which converges to a throat region from which a diverging outlet section extends. The inlet section is coupled in the fluid flow path of the heat engine at the boiler outlet, while its outlet section is coupled to a downstream condenser. The working fluid from the evaporator of the heat pump is entrained at a point downstream of the throat region where the pressure in the nozzle is lower than the pressure at the exit of the evaporator. The pressure of the second working fluid from the heat pump is lower than that of the exiting fluid (and the input fluid from the heat engine). The two fluids are mixed together and decelerated by the nozzle, causing the working fluid exiting the nozzle to be compressed to a pressure intermediate that of the heat engine fluid and the heat pump fluid. The working fluid is preferably comprised of at least one fluid compound selected from the group consisting of a carbon disulfide and a bromine fluid compound and a phosphorus, phosphoryl or thiophosphoryl fluid compound having the formula PXXX or PZXXX, wherein P corresponds to phosphorus, Z corresponds to one of oxygen (O) and sulfur (S), and X corresponds to one of fluorine (F), chlorine (Cl), bromine (Br) and iodine (I).

4 Claims, 3 Drawing Sheets

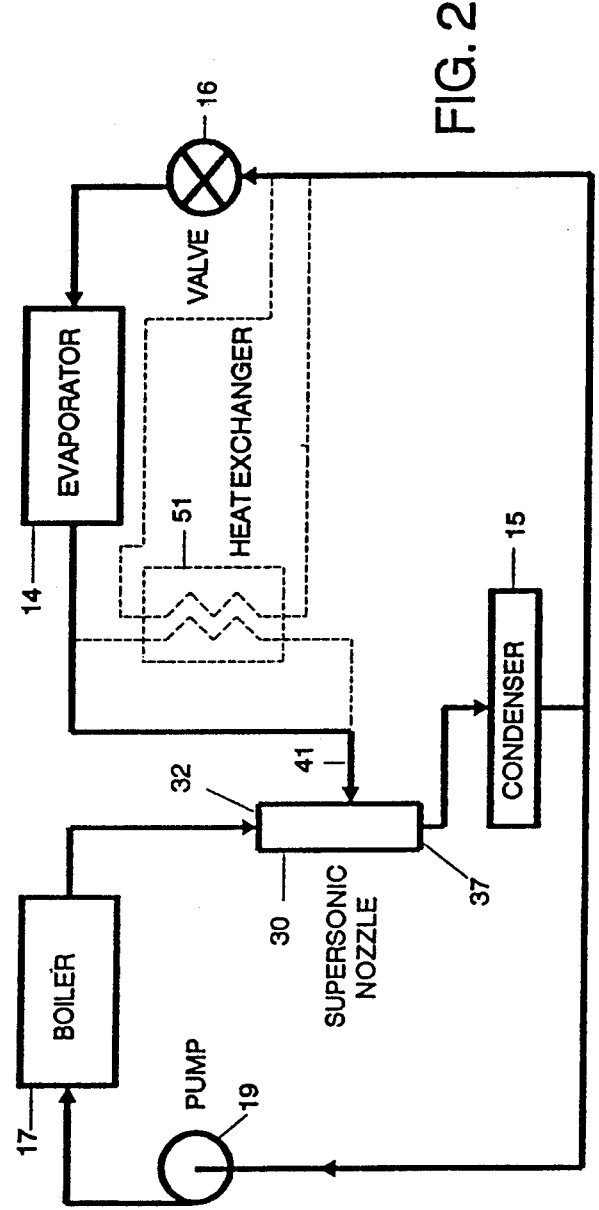

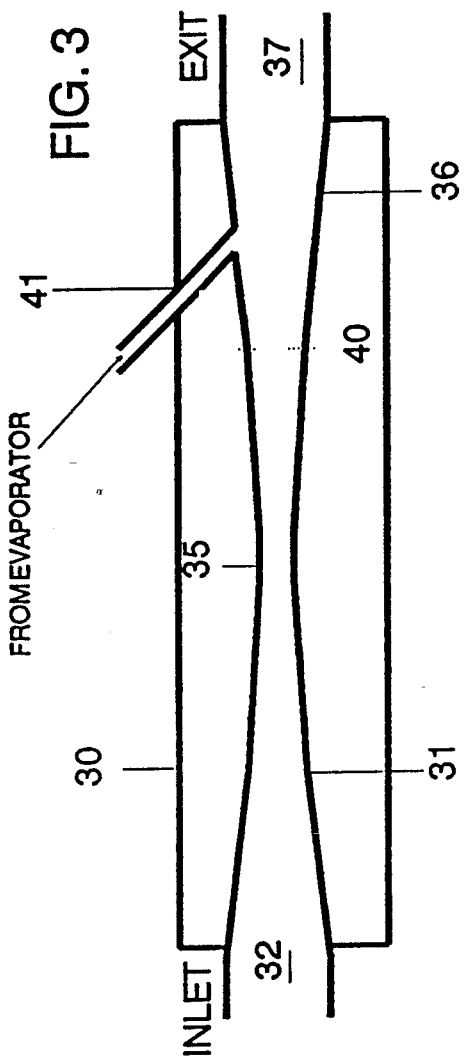

WORKING FLUID FOR THERMALLY POWERED HEAT PUMPING APPLICATIONS

This is a division of U.S. application Ser. No. 141,300, filed Jan. 6, 1988, now U.S. Pat. No. 4,905,481, issued Mar. 6, 1990.

FIELD OF THE INVENTION

The present invention relates in general to thermally driven energy transfer systems and, in particular, to an improved (heat pump) working fluid and a supersonic nozzle arrangement therefor.

BACKGROUND OF THE INVENTION

Thermally driven energy transfer systems (e.g. heat pumps, high temperature power units) are employed in a variety of energy conversion environments, from nuclear power generators to spacecraft. One example of a heat pump system, which uses a Rankine heat engine to power a vapor compression heat pump, is diagrammatically illustrated in FIG. 1 as comprising a boiler-driven turbine 11, the output shaft 13 of which drives a compressor 12. Each of turbine 11 and compressor 12 uses a common working fluid used which is collected by a condenser 15 and coupled therefrom to a boiler 17, via a pump 19, and an evaporator 14, via a throttling valve 16. By using a common working fluid for both the turbine and the compressor, these two units may be hermetically sealed in a single unit, shown by broken lines 20, thereby reducing the need for (periodically maintained) reservoirs of both lubricant (for the drive shaft 13) and refrigerant, and thus reducing system weight and complexity, factors which are of particular importance in spaceborne applications. Rankine powered compression systems which utilize a common condenser (the single working fluid approach) have performance and weight advantages over chemical or absorption heat pump systems. However, they still employ a rotating (turbine) or reciprocating expander and compressor, which are not only sybject to breakdown, but low exit qualities can cause turbine blade imbalance and blade erosion, resulting from the impingement of droplets on the turbine blades.

An additional factor in the operation of heat pump containing thermal energy transfer systems is the ability of the working fluid to perform successfully over the temperature range to which it is subjected in the course of its transit between heat source and heat sink. Its melting point must be lower than the lowest temperature in the heat exchange cycle in order to prevent fluid precipitation throughout the cycle and its critical temperature must be above the heat sink temperature, so as to allow the fluid to condense at the heat sink temperature. In addition, the fluid should not build up excessive pressure at the highest temperature of the cycle and should be stable at this temperature. Ideally, the working fluid should have as low a specific volume as possible, in order to minimize the volume of the system and it must be stable and compatible with the materials of which the system is constructed.

Currently, there are three principal types of working fluids in use for high-temperature power and heat pump systems: 1) high-molecular weight organic fluids; 2) liquid metals; and 3) water. Because high-molecular weight fluids can be used in cycles with temperatures only up to about 700K, they cannot be applied to systems that operates over a very wide temperature range, such as nuclear power generation plants, that have a temperature range on the order of 300 degrees K to 1500 degrees K, and spacecraft systems, having a power source temperature of 1000 degrees K and electronic components typically operating at 300 degrees K.

Nuclear power plants customarily handle the temperature range problem by using two working fluids in two cycles, using liquid metals in a range between the high end extreme and an intermediate temperature, and water between the intermediate temperature and the low end of the scale. Spaceborne systems, however, unlike terrestrial power plants, face a weight (payload) constraint in which the systems must be as lightweight and compact as possible and the fluid should have as low a specific volume as possible. Because the melting points of liquid metals are well above room temperature and their vapor pressures are too low at room temperature, the use of a liquid metal for the high end of the range would require a two fluid/two cycle system akin to that of a nuclear power plant, thereby adding unwanted complexity and weight to the system. Because of its thermal stability and its compatibility with many construction materials, water would appear to be a good candidate for a spaceborne application. Unfortunately, however, because of the high specific volume of steam, water cannot be employed satisfactorily at high temperatures. (It should be noted that common refrigerants, such as Freon (a registered Trademark of Dupont), are unstable at high temperatures and cannot be used in high temperature power cycles.)

SUMMARY OF THE INVENTION

In accordance with the present invention, the above-described drawbacks of conventional thermally driven energy transfer systems are obviated by a new and improved heat pump apparatus and associated working fluid that is operational over a range of temperatures not previously enjoyed by conventional thermal energy transmission media, thereby making it a particularly attractive working fluid for applications encountering wide temperature differentials. Pursuant to a first aspect of the present invention a considerably improved thermally powered heat pump involves the use of a supersonic nozzle in place of a conventional turbine-compressor unit within a Rankine heat engine powering a vapor compression heat pump. The supersonic nozzle has an inlet section which converges to a throat section from which a diverging outlet section extends. The inlet section is coupled in the fluid flow path of the heat engine and receives a thermal working fluid at a first pressure and a first temperature. The working fluid exits the outlet section of the nozzle at a second pressure lower than the first pressure. The working fluid from an evaporator within the heat pump is applied to a region of the diverging section of the nozzle that is downstream of the point where the pressure in the nozzle is lower than the pressure of the applied evaporator fluid. The pressure of the applied evaporator fluid is lower than the pressure of the exiting fluid. Downstream of the application of the evaporator fluid, the combined flow is decelerated, causing the fluid to be compressed to a pressure intermediate that of the evaporator fluid and the input fluid. The exiting fluid is liquified via a downstream condenser and supplied therefrom to each of the Rankine engine and the heat pump.

In accordance with a second aspect and preferred embodiment of the invention, there is provided a new and improved working fluid comprised of one or more of a carbon disulfide and a bromine fluid compound having the formula $Br_2$ and $CS_2$, and a phosphorus, phosphoryl or thiophosphoryl fluid compound having the formula PXXX or PZXXX, wherein P corresponds to phosphorus, Z corresponds to one of oxygen (O) and sulfur (S), and X corresponds to one of fluorine (F), chlorine (Cl), bromine (Br) and iodine (I). These fluid compounds have low specific volume in their vapor phase and possess thermal stability. Of particular significance is the ability of such fluid compounds to operate over very wide temperature ranges, from room temperature to well over 1000 degrees K. In addition, these fluids have higher thermodynamic efficiency than water over a working temperature range of 300 to 1000 degrees K. Because of its wide operational temperature range, such a working fluid readily lends itself to use in thermal energy transfer applications (e.g. thermal energy loops, heat engines and heat pumps), where simplicity and weight are significant control factors. Consequently, its use in the above-described apparatus employing a supersonic nozzle in place of a turbine-compressor unit results in an energy transfer system whose reduced hardware complexity and improved performance make it compatible with severe environment applications, such as nuclear power and spaceborne systems.

BRIEF DESCRIPTION OF THE DRAWINGS

FIG. 2 diagrammatically illustrates a thermally driven heat pump system employing a supersonic nozzle for coupling a high temperature, high pressure heat engine to a low pressure, low temperature heat pump in accordance with the present invention; and FIG. 3 shows, in greater detail, the configuration of and interconnection ports for the supersonic nozzle of the thermal energy transfer system of FIG. 2.

DETAILED DESCRIPTION

Figure 1:
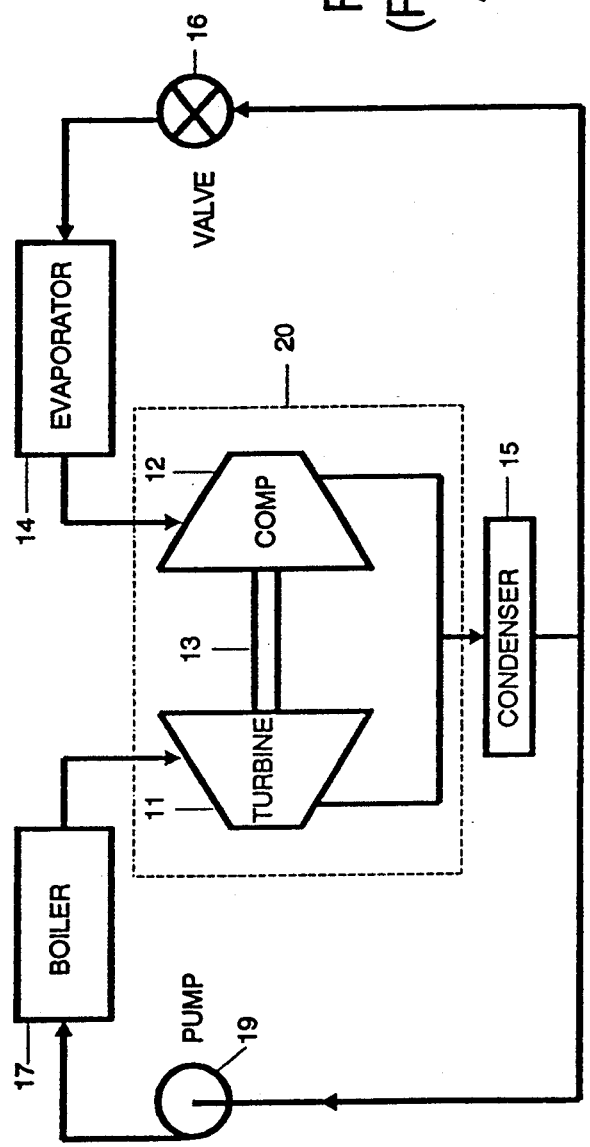
FIG. 1 diagrammatically illustrates an example of a conventional thermally driven heat pump system, in which a Rankine heat engine powers a vapor compression heat pump through a turbine-driven compressor.

As described briefly above, in accordance with a first aspect of the present invention, maintenance and hardware problems associated with a conventional turbine-driven compressor used to a couple a high pressure, high temperature heat engine to a low pressure, low temperature heat pump is obviated by replacing the multi-component (many moving parts) turbine/compressor unit with a supersonic nozzle, that has no moving parts, and is therefore simpler, lighter, and requires no hermetic sealing. Such a replacement is diagrammatically illustrated in FIG. 2 by way of a converging-/diverging nozzle 30 having an inlet section 31, to a first, input port 32 of which the output of heat engine boiler 17 is coupled. Inlet section 31 converges to a reduced cross-section throat region 35 from which extends a diverging, outlet section 36 having a second, output port 37, which is coupled to a downstream condenser 15. Nozzle 30 has an additional, or third, control port 41 which is located at a portion of diverging outlet section 36 downstream of throat region 35 and is coupled to receive the low pressure working fluid supplied by heat pump evaporator 14. As will be described in more detail below with reference to FIG. 3, the working fluid supplied by the heat pump is entrained into the supersonic flow of the working fluid from the heat engine in diverging outlet section 36. At a point beyond the location of third port 41, the resulting flow is decelerated, thereby compressing the fluid to a pressure intermediate that of the high pressure input fluid at inlet port 32 and the low pressure fluid from evaporator 14.

The coefficient of performance (COPc) of the heat pump can be increased by coupling a heat exchanger between the return line from the condenser 15 and the output of evaporator 14 as shown in broken lines in FIG. 3. The working fluid leaving condenser 15 is cooled by heat exchanger 51 which transfers heat to the cooler fluid leaving evaporator 14, thereby allowing more heat to be transferred to the working fluid leaving the evaporator.

The material of which nozzle 30 is constructed must be compatible with the working fluid(s) used in the heat engine and heat pump. The nozzle must also be strong enough to withstand the high velocities and low pressures that occur in diverging outlet section 36. Of the above-referenced group of the fluid compounds, where thiophosphoryl chloride is selected as the working fluid, stainless steel has been found to be a suitable nozzle material. The interior walls of the respective sections of the nozzle are made as smooth as possible in order to minimize losses and early condensation due to friction.

The exact shape of the nozzle and the location of evaporator inlet port 41 may be determined for a given set of operational parameters (evaporator temperature, pressure and flow rate, condenser pressure and boiler temperature), so as to optimize the nozzle configuration for maximum COPc of the thermally driven heat pump. To this end, using the equations for working fluid, continuity, momentum and energy, described, for example in an article by B. I. Lee et al entitled "A Generalized Thermodynamic Correlation Based on Three-Parameter Corresponding States", AIChE Journal, Vol. 21, pp 510–527, May, 1975, fluid flow through the nozzle is modelled using differential sections of the nozzle.

As described in that article, the general form of the energy equation is:

$$\frac{\delta Q}{\delta t} + \frac{\delta W}{\delta t} = \frac{\partial}{\partial t} \int_{c.v.} \rho e dv + \int_{c.s.} \left(\frac{p}{\rho} + e\right) \overline{\rho v \cdot dA}.$$

The four equations used in modeling the flow of the working fluid through the supersonic compressor are:

1. Continuity Equation.

General:

$$0 = \frac{\partial}{\partial t} \int_{cv} \rho dv + \int_{cs} \overline{\rho v \cdot dA}$$

Applied to a Steady-State Differential Element:

$$\frac{dp}{p} + \frac{dA}{A} + \frac{dV}{V} = \frac{d\dot{m}g}{\dot{m}}$$

2. Energy Equation

General:

$$\frac{\delta Q}{\delta t} + \frac{\delta W}{\delta t} = \frac{\partial}{\partial t} \int_{cv} \rho e dv + \int_{cs} \left(\frac{p}{\rho} + e\right) \overline{\rho v \cdot dA}$$

Applied to a Steady-State Differential Element:

$$dQ - dW = dh + VdV + \left(h_{gT} - h_g + \frac{1}{2}V^2\right)\frac{dm_g}{\dot{m}}$$

3. Momentum equation

General:

$$\Sigma \vec{F} = \frac{\partial}{\partial t}\int_{cv} \rho \vec{v} dv + \int_{cs} \rho \vec{v}\vec{v} \cdot d\vec{A}$$

Applied to a steady-State Differential Element:

$$-Adp - \tau_w dA_w - \dot{m}dV + Vdm_g$$

4. Equation of State of the Working Fluid

General:

$$p = \rho ZRT$$

Applied to a Steady-State Differential Element:

$$\frac{dp}{p} = \frac{d\rho}{\rho} + \frac{dT}{T} + \frac{dZ}{Z}$$

The compressibility factor Z may be determined using the procedure described in the above cited Lee et al article. This reference also includes equations for the enthalpy and entropy of the working fluid.

| NOMENCLATURE: | |
|---|---|
| $\rho$ | Density |
| $v$ | Control volumne (i.e. the differential element) |
| V | Velocity |
| A | Area |
| $\dot{m}$ | Mass flow rate |
| $\dot{m}_g$ | Mass flow rate of evaporator gas |
| h | Enthalpy |
| $h_g$ | Enthalpy of evaporator gas at evaporator temperature |
| $h_{gT}$ | Enthalpy of evaporator gas at nozzle temperature |
| F | Force |
| p | Pressure |
| T | Temperature |
| R | Gas Constant of the Working Fluid |
| W | Work |
| Q | Heat |
| Z | Compressibility |
| $dA_W$ | Wall Shear Area |
| $\tau$ | Shear Stress |
| t | Time |

The longitudinal interior shape of the nozzle is assumed to be a shallow parabolic arc, with inlet section converging in order to accelerate the subsonic fluid flow from the boiler. From the above referenced equations, the pressure, temperature, velocity and speed of sound at the interior end of inlet section 31 are determined. If the fluid flow is subsonic at the end of the differential section, the next section is also converging. If the flow is supersonic, then the next section and all downstream sections are configured to be diverging. This iterative procedure is repeated until the pressure at the end of the section currently being evaluated is less than the pressure at the output of evaporator 14 by a prescribed amount, thereby establishing the location of inlet port 41.

The next section models the mixing of the two working fluids with the constraint that the flow at the end of the section must be supersonic. From this constraint the flow rate of evaporator 14 relative to the flow rate of boiler 17 can be determined. Since the nozzle exit pressure (i.e. the operating pressure of condenser 15) is known, the location of the normal/oblique shock or condensation shock can be calculated and the exit temperature can be determined using differential section calculations. The COPc can be maximized by varying the amount of boiler superheat, the boiler flow rate and the pressure difference between the exit of evaporator 14 and the nozzle pressure at port 41 using the above described procedure for modelling flow through the nozzle.

In addition to defining the size, shape and control port locations of the supersonic nozzle in the manner explained above, its thickness may be determined by the following equation:

$$t = Spr/\sigma$$

where:
t = minimum thickness,
p = maximum pressure,
r = inlet radius,
$\sigma$ = allowable stress, and
S = safety factor.

As an illustrative example, assuming a maximum (boiler exit) pressure p = 100 atm., a radius r = 0.5 in., a conventional safety factor S = 2 and an allowable stress (from standard materials handbook) $\sigma$ = 24,000 psi, then $$t = (2)(100 \text{ atm.})(0.5 \text{ in.})/(24,000 \text{ psi})$$
$$= 0.06 \text{ in.}$$

In operation, a high pressure superheated working fluid produced by boiler 17 enters the inlet section 31 of supersonic nozzle 30 through inlet port 32. As the working fluid traverses the converging inlet section it is accelerated due to the compressibility of the superheated vapor and reaches a velocity equal to the speed of sound in the vapor (Mach 1) near or at throat region 35. As the fluid accelerates, the pressure decreases to about 50% of the inlet pressure at the throat. The fluid continues to accelerate in diverging outlet section 36, again due to the compressibility of the vapor and the pressure continues to decrease in the diverging outlet section. At some location 40 within diverging outlet section 36 the pressure of the vapor will be equal to the exit pressure of heat pump evaporator 14. As described above, this location may be defined a fluid flow model through the nozzle in terms of the above equations. With location 40 having been defined, the third, control port 41 is positioned downstream of point 40 in order to ensure entrainment of the working fluid from heat pump evaporator 14 into the heat engine working fluid from boiler 17 (due to the lower pressure in the nozzle). The exit temperature and pressure of the heat engine boiler 17 are appropriately adjusted, so that the working fluid does not begin to condense and thereby decelerate before entrainment of the evaporator fluid.

After the two working fluids have been mixed together, the combined flow is decelerated through normal/oblique shock or condensation shock, thereby resulting in a compression of the combined fluids to a pressure equal to the pressure of condenser 15.

As pointed out above, pursuant to a further aspect of the present invention, operation of the thermal energy transfer system shown in FIG. 1 may be enhanced through the use of a new and improved working fluid comprised of one or more of a carbon disulfide and a bromine fluid compound having the formula $Br_2$ and $CS_2$, and a phosphorus, phosphoryl or thiophosphoryl fluid compound having the formula PXXX or PZXXX, wherein P corresponds to phosphorus, Z corresponds to one of oxygen (O) and sulfur (S), and X corresponds to one of fluorine (F), chlorine (Cl), bromine (Br) and iodine (I). Advantageously, these fluid compounds have low specific volume in their vapor phase and possess thermal stability, and can operate over very wide temperature ranges, from room temperature to well over 1000 degrees K., so that they are particularly suited to high temperature heat pump and heat engine environments. Moreover, these fluids have higher thermodynamic efficiency than water over a working temperature range of 300 to 1000 degrees K., so that the same working fluid may be used in both the Rankine heat engine and in the heat pump, with a shared condenser 15 being coupled downstream of nozzle 30 for fluid recovery and recycling. (As noted earlier, although water has the potential to work over a temperature range in excess of 1000 K., it has a very high specific volume in its vapor phase, thereby making in practically unsuitable for spaceborne applications.)

The selection of a specific phosphorus halide, phosphoryl halide, thiophosphoryl halide, bromine or carbon disulfide working fluid will depend upon the compatibility of the physical parameters of the fluid to the characteristics of the thermal energy transfer system in which it is employed. In the present example of a Rankine engine-driven heat pump, for an operational temperature range between 300 and 1000 degrees K. the working fluid may comprise $CS_2$, $Br_2$, $PSCl_3$, or $PCl_3$. Set forth below in Table I is a list of operational temperature ranges of the Rankine engine-driven heat pump and the repsective working fluids selected for use over that operational temperature range. The fluids were selected on the basis of having at least equal pereformance to water, while having a lower specific volume than water in the vapor phase. These fluids have also been shown to outperform common refrigerants such as R-11, R-12 and R-22.

TABLE I

| Selected Working Fluids for Various Tamperature Ranges | | |
|---|---|---|
| Fluid | Maximum Specific Volume (m³/kg) | COP |
| Temperature Range: 294.26 K–644.26 K | | |
| $POF_2Cl$ | 0.09494 | 1.7867 |
| $PSF_2Cl$ | 0.09847 | 1.8235 |
| $PF_2Br$ | 0.03430 | 1.4315 |
| Temperature Range: 300 K–1000 K | | |
| $Br_2$ | 0.5086 | 0.5576 |
| $CS_2$ | 0.6414 | 0.5192 |
| $PSCl_3$ | 0.9970 | 0.5314 |
| $PCl_3$ | 1.044 | 0.4905 |
| Temperature Range: 300 K–1500 K | | |
| $Br_2$ | 0.5086 | 0.6376 |
| $CS_2$ | 0.6414 | 0.5518 |
| $PSCl_3$ | 0.9970 | 0.5424 |

Selection of a specific working fluid over the lowest temperature range of Table I will depend on the relative importance of having a high performance versus a low specific volume, since there is a trade-off between these parameters in the low temperature range. In general, the choice of a particular fluid compound or group of fluids will be based upon the development of a methematical model for a specific heat transfer cycle using the energy equations set forth above and then selecting the best working fluid for that cycle over a given temperature range. At the other temperature ranges, $Br_2$ is a preferable fluid, followed by $CS_2$, $PSCl_3$ and $PCl_3$. Based on performance, these fluids have been found to be superior.

An additional property of phosphorus halides, phosphoryl halide, thiophosphoryl halides and bromine and is their miscibility in organic solvents such as carbon disulfide and ether. These types of fluid mixtures may be used for absorption refrigeration or other chemical heat pump cycles and as non-azeotropic working fluids in heat pump and heat engine applications.

As will be appreciated from the foregoing description, in accordance with the present invention, the above-described drawbacks of conventional thermally driven energy transfer systems are obviated by a new and improved thermal energy transfer apparatus and a working fluid that is capable of operating over a wide temperature range. By using a supersonic nozzle in place of a conventional turbine-compressor unit, system hardware and maintenance are considerably simplified. In addition, the number of environments to which this or other thermal energy transfer systems may be applied is increased by using, as the system working fluid, a carbon disulfide and a bromine fluid compound having the formula $Br_2$ and $CS_2$, and a phosphorus, phosphoryl or thiophosphoryl fluid compound having the formula PXXX or PZXXX, wherein P corresponds to phosphorus, Z corresponds to one of oxygen (O) and sulfur (S), and X corresponds to one of fluorine (F), chlorine (Cl), bromine (Br) and iodine (I). As pointed out above, these fluid compounds have low specific volume in their vapor phase, are thermally stable and can operate over very wide temperature ranges, from room temperature to well over 1000 degrees K. Moreover, because such a fluid has a higher thermodynamic efficiency than water over a temperature range of 300 to 1000 degrees K. it readily lends itself for use in thermal energy transfer applications where simplicity, performance and weight are significant control factors. Consequently, its use in the above-described apparatus employing a supersonic nozzle in place of a turbine-compressor unit results in an energy transfer system whose reduced hardware complexity and improved performance make it compatible with severe environment applications, such as nuclear power and spaceborne systems.

While we have shown and described embodiments of the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. In a thermal energy transfer system having a heat exchanger through which a thermal working fluid is applied so as to effect a thermal energy transfer betwen said thermal working fluid and a thermal interface of said heat exchanger, the improvement wherein said thermal working fluid consists essentially of a phosphorus, phosphoryl or thiophosphoryl fluid compound having the formula PXXX or PZXXX, wherein P is phosphorus, Z is selected from the group consisting of oxygen (O) and sulfur (S), and X is selected from the group consisting of fluorine (F), chlorine (Cl), bromine (Br) and iodine (I).

2. The improvement according to claim 1, wherein the temperature range over which said energy transfer system operates extends from less than room temperature to 1500 degrees K.

3. A method of interfacing thermal energy with respect to a heat transfer device comprising the step of:

applying to said heat exchange device a working fluid which consists essentially of a phosphorus, phosphoryl or thiophosphoryl fluid compound having the formula PXXX or PZXXX, wherein P is phosphorus, Z is selected from the group consisting of oxygen (O) and sulfur (S), and X is selected from the group consisting of fluorine (F), chlorine (Cl), bromine (Br) and iodine (I), whereby thermal energy is transferred between said heat exchange device and working fluid.

4. A method according to claim 3, wherein the temperature range over which said heat transfer device operates extends from less than room temperature to 1500 degrees K.

* * * * *